United States Patent
Um et al.

(10) Patent No.: US 12,454,731 B2
(45) Date of Patent: *Oct. 28, 2025

(54) HOT-DIP GALVANNEALED STEEL SHEET WITH ULTRA-HIGH STRENGTH AND HIGH FORMABILITY, AND MANUFACTURING METHOD THEREFOR

(71) Applicant: Hyundai Steel Company, Incheon (KR)

(72) Inventors: Ho Yong Um, Incheon (KR); Nam Hoon Goo, Incheon (KR); Min Sung Kim, Incheon (KR); Gyu Jin Oh, Incheon (KR)

(73) Assignee: Hyundai Steel Company, Incheon (KR)

( * ) Notice: Subject to any disclaimer, the term of this patent is extended or adjusted under 35 U.S.C. 154(b) by 937 days.

This patent is subject to a terminal disclaimer.

(21) Appl. No.: 17/608,409

(22) PCT Filed: May 15, 2020

(86) PCT No.: PCT/KR2020/006386
§ 371 (c)(1),
(2) Date: Nov. 2, 2021

(87) PCT Pub. No.: WO2021/117988
PCT Pub. Date: Jun. 17, 2021

(65) Prior Publication Data
US 2022/0307100 A1    Sep. 29, 2022

(30) Foreign Application Priority Data
Dec. 9, 2019 (KR) .................. 10-2019-0162494

(51) Int. Cl.
*C21D 8/02* (2006.01)
*C22C 38/00* (2006.01)
(Continued)

(52) U.S. Cl.
CPC ......... *C21D 8/0205* (2013.01); *C21D 8/0226* (2013.01); *C21D 8/0236* (2013.01);
(Continued)

(58) Field of Classification Search
None
See application file for complete search history.

(56) References Cited

U.S. PATENT DOCUMENTS

| | | | |
|---|---|---|---|
| 10,449,751 B2 | 10/2019 | Fushiwaki et al. | |
| 2018/0363088 A1* | 12/2018 | Tsuzumi | C22C 38/22 |
| 2022/0220576 A1* | 7/2022 | Um | C22C 38/002 |

FOREIGN PATENT DOCUMENTS

| | | |
|---|---|---|
| CN | 103060678 A | 4/2013 |
| CN | 103797145 A | 5/2014 |

(Continued)

OTHER PUBLICATIONS

Machine translation of KR2019-0058053A. May 29, 2019. (Year: 2019).*

(Continued)

*Primary Examiner* — Xiaowei Su
(74) *Attorney, Agent, or Firm* — Fox Rothschild LLP

(57) ABSTRACT

Disclosed are a hot-dip galvannealed steel sheet with ultra-high strength and high formability, and a manufacturing method therefor. In an exemplary embodiment, a hot-dip galvannealed steel sheet include: a base steel sheet; and a hot-dip galvannealed layer formed on the surface of the base steel sheet. The base steel sheet includes an amount of 0.05 to 0.15 wt % of carbon (C), an amount greater than 0 and less than or equal to 1.0 wt % of silicon (Si), an amount of 4.0 to 9.0 wt % of manganese (Mn), an amount greater than 0 and less than or equal to 0.6 wt % of aluminum (Al), an amount greater than 0 and less than or equal to 0.02 wt % of phosphorus (P) in, an amount greater than 0 and less than (Continued)

or equal to 0.005 wt % of sulfur (S), an amount greater than 0 and less than or equal to 0.006 wt % of nitrogen (N), and the balance of iron (Fe) and other inevitable impurities. The base steel sheet has a microstructure consisting of ferrite and retained austenite; the grain size of the microstructure is 3 μm or less; and the hot-dip galvannealed steel sheet has a yield strength (YS) of 800 MPa or greater, a tensile strength (TS) of 980 MPa or greater, an elongation (EL) of 25% or greater, and a hole expansion ratio (HER) of 20% or greater.

15 Claims, 2 Drawing Sheets

(51) Int. Cl.
  *C22C 38/02*  (2006.01)
  *C22C 38/04*  (2006.01)
  *C22C 38/06*  (2006.01)
  *C22C 38/12*  (2006.01)
  *C22C 38/14*  (2006.01)
  *C23C 2/02*  (2006.01)
  *C23C 2/28*  (2006.01)
  *C23C 2/40*  (2006.01)

(52) U.S. Cl.
  CPC .......... *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C23C 2/02* (2013.01); *C23C 2/0224* (2022.08); *C23C 2/28* (2013.01); *C23C 2/40* (2013.01); *C21D 2211/001* (2013.01); *C21D 2211/005* (2013.01)

(56) References Cited

FOREIGN PATENT DOCUMENTS

| | | |
|---|---|---|
| EP | 2 530 179 A1 | 12/2012 |
| JP | 2012-237054 A | 12/2012 |
| KR | 2012-0070739 A | 7/2012 |
| KR | 2014-0060574 A | 5/2014 |
| KR | 101677396 B1 | 11/2016 |
| KR | 101798771 B1 | 11/2017 |
| KR | 20190058053 A * | 5/2019 |
| WO | 2009/142362 A1 | 11/2009 |
| WO | 2016/113789 A1 | 7/2016 |

OTHER PUBLICATIONS

Examination Report issued on Aug. 1, 2022 in corresponding Indian Patent Application No. 202217007438.
Notification of First Office Action issued Mar. 21, 2022 in Chinese Application No. 202080035743.6.
Office Action issued on Dec. 23, 2023 in corresponding German Patent Application No. 112020006041.1.

* cited by examiner ized layer by immersing the cold-rolled sheet subjected to

HOT-DIP GALVANNEALED STEEL SHEET WITH ULTRA-HIGH STRENGTH AND HIGH FORMABILITY, AND MANUFACTURING METHOD THEREFOR

CROSS-REFERENCE TO RELATED APPLICATIONS

This application is a National Phase application filed under 35 USC 371 of PCT International Application No. PCT/KR2020/006386 with an International Filing Date of May 15, 2020, which claims priority from Korean Application 10-2019-0162494 filed on Dec. 9, 2019. The entire contents of these applications are incorporated herein by reference in their entirety.

TECHNICAL FIELD

The present invention is related to a hot-dip galvannealed steel sheet with ultra-high strength and high formability and a manufacturing method therefor, and more particularly, to a hot-dip galvannealed steel sheet with ultra-high strength and improved formability and a manufacturing method therefor.

BACKGROUND

Recently, from the viewpoint of safety and lightness of a vehicle, the strength of a steel sheet for the vehicle has been more rapidly increased. In order to secure the safety of passengers, the strength or thickness of steel sheets used as structural members of the vehicle should be increased to secure sufficient impact toughness. In addition, the steel sheets to be applied to vehicle components are required to have sufficient formability, and the weight of the vehicle body is essentially decreased to improve fuel efficiency of the vehicle. Thus, research to continuously strengthen the steel sheet for the vehicle and increase the formability thereof has been conducted.

Currently, as a high-strength steel sheet for the vehicle having the above-mentioned properties, there have been proposed a dual-phase steel that secures strength and an elongation in two phases of ferrite and martensite and a transformation induced plasticity steel that secures strength and an elongation through phase transformation of retained austenite in a final structure during plastic deformation. However, the development based on a dual-phase steel that cannot escape the limits of the Rule of mixture (ROM) and a transformation induced plasticity steel, which has a relatively low strength because a main matrix is composed of bainite, has reached its limit. Thus, the direction of developing next-generation ultra-high strength steel sheets for the vehicle that improve the microstructure of the transformation induced plasticity steel to secure ultra-high strength and high formability has been attracted the attention of each steel manufacturer.

As a related technology, there is Korean Patent No. 10-1798771 (published on Nov. 17, 2017, entitled: Ultra High Strength and High Ductility Steel Sheet Having Superior Yield Strength and Method for Manufacturing the same).

SUMMARY OF THE INVENTION

Technical Problem

According to an exemplary embodiment of the present invention, provided is a hot-dip galvannealed steel sheet having ultra-high strength and high formability.

According to an exemplary embodiment of the present invention, provided is a hot-dip galvannealed steel sheet having excellent elongation and hole expansion ratio.

According to an exemplary embodiment of the present invention, provided is a hot-dip galvannealed steel sheet having excellent quality of a hot-dip galvannealed layer.

According to an exemplary embodiment of the present invention, provided is a method for manufacturing a hot-dip galvannealed steel sheet.

Technical Solution

One aspect of the present invention relates to a hot-dip galvannealed steel sheet. In an exemplary embodiment, the hot-dip galvannealed steel sheet includes a base steel sheet; and a hot-dip galvannealed layer formed on the surface of the base steel sheet; wherein the base steel sheet includes: an amount of 0.05 to 0.15 wt % of carbon (C), an amount greater than 0 and less than or equal to 1.0 wt % of silicon (Si), an amount of 4.0 to 9.0 wt % of manganese (Mn), an amount greater than 0 and less than or equal to 0.6 wt % of aluminum (Al), an amount greater than 0 and less than or equal to 0.02 wt % of phosphorus (P), an amount greater than 0 and less than or equal to 0.005 wt % of sulfur (S), an amount greater than 0 and less than or equal to 0.006 wt % of nitrogen (N), and the balance of iron (Fe) and other inevitable impurities; the base steel sheet has a microstructure composed of ferrite and retained austenite, the grain size of the microstructure is 3 µm or less, and the hot-dip galvannealed steel sheet has a yield strength (YS) of 800 MPa or greater, a tensile strength (TS) of 980 MPa or greater, an elongation (EL) of 25% or greater, and a hole expansion ratio (HER) of 20% or greater.

In an exemplary embodiment, the base steel sheet may further include one or more components of niobium (Nb), titanium (Ti), vanadium (V), and molybdenum (Mo), and each of the one or more components may be included in an amount greater than 0 and less than or equal to 0.02 wt %.

In an exemplary embodiment, the base steel sheet may further include boron (B) in an amount greater than 0 and less than or equal to 0.001 wt %.

In an exemplary embodiment, a volume fraction of the retained austenite in the microstructure may be 10 to 30 vol %.

Another aspect of the present invention relates to a method for manufacturing a hot-dip galvannealed steel sheet. In an exemplary embodiment, the method for manufacturing a hot-dip galvannealed steel sheet includes: (a) manufacturing a hot-rolled sheet using a steel slab, wherein the steel slab includes: an amount of 0.05 to 0.15 wt % of carbon (C), an amount greater than 0 and less than or equal to 1.0 wt % of silicon (Si), an amount of 4.0 to 9.0 wt % of manganese (Mn), an amount greater than 0 and less than or equal to 0.6 wt % of aluminum (Al), an amount greater than 0 and less than or equal to 0.02 wt % of phosphorus (P), an amount greater than 0 and less than or equal to 0.005 wt % of sulfur (S), an amount greater than 0 and less than or equal to 0.006 wt % of nitrogen (N), and the balance of iron (Fe) and other inevitable impurities; (b) manufacturing a cold-rolled sheet by cold rolling the hot-rolled sheet; (c) performing a primary heat treatment by heating the cold-rolled sheet in a temperature range of $A_{c3}$ to $(A_{c3}+15)$ ° C.; (d) performing a secondary heat treatment by heating the cold-rolled sheet subjected to the primary heat treatment at a temperature of a dual-phase domain; (e) forming a hot-dip galvanized layer by immersing the cold-rolled sheet subjected to the secondary heat treatment in a hot-dip galvanizing bath;

and (f) performing a galvannealing treatment on the cold-rolled sheet on which the hot-dip galvanized layer is formed, wherein after the step (d), the cold-rolled sheet has a microstructure composed of ferrite and retained austenite.

In an exemplary embodiment, the steel slab may further include one or more components of niobium (Nb), titanium (Ti), vanadium (V), and molybdenum (Mo), and each of the one or more components is included in an amount greater than 0 and less than or equal to 0.02 wt %.

In an exemplary embodiment, the steel slab may further include boron (B) in an amount greater than 0 and less than or equal to 0.001 wt %.

In an exemplary embodiment, a volume fraction of the retained austenite in the microstructure may be 10 to 30 vol %.

In an exemplary embodiment, the step (c) may include: cooling and maintaining the heated cold-rolled sheet to a temperature of 350 to 450° C. at a cooling rate of 4 to 10° C./s.

In an exemplary embodiment, the step (d) may include: cooling and maintaining the heated cold-rolled sheet to a temperature of 450 to 550° C. at a cooling rate of 2 to 8° C./s.

In an exemplary embodiment, the hot-rolled sheet may be manufactured by including: (a1) reheating the steel slab to a temperature of 1150 to 1250° C.; (a2) preparing a rolled material by hot rolling the reheated steel slab at a finish rolling temperature of 925 to 975° C.; and (a3) cooling the rolled material subjected to the hot rolling treatment at a cooling rate of 10 to 30° C./s, and coiling the cold-rolled material under conditions of a coiling temperature of 700° C. to 800° C.

In an exemplary embodiment, the method for manufacturing a hot-dip galvannealed steel sheet may further include: between the step (a) and the step (b), subjecting the hot-rolled sheet to a softening heat treatment at a temperature of 550° C. to 650° C.

In an exemplary embodiment, the galvannealing treatment in the step (f) may be performed under the condition of a temperature of 500 to 600° C.

In an exemplary embodiment, after the step (d), the cold-rolled sheet may have a yield strength (YS) of 800 MPa or greater, a tensile strength (TS) of 9801V1 Pa or greater, an elongation (EL) of 25% or greater, and a hole expansion ratio (HER) of 20% or greater.

In an exemplary embodiment, after the step (d), the grain size of the cold-rolled sheet may be 3 μm or less.

Advantageous Effects

According to the present invention, it is possible to manufacture a steel sheet having a microstructure composed of ultrafine-grained ferrite and retained austenite can be manufactured, through control of component systems and control of process conditions. The fine-grained ferrite may cause the steel sheet to have high strength, retained austenite present in a content of 10 to 30 vol % in the microstructure may cause high strength and elongation, and control of the shape of the microstructure can function to have a high hole expansion ratio (HER). As a result, it is possible to manufacture a hot-dip galvannealed steel sheet having high formability and high strength, and having excellent quality of a hot-dip galvannealed layer.

DETAILED DESCRIPTION

Figure 1:
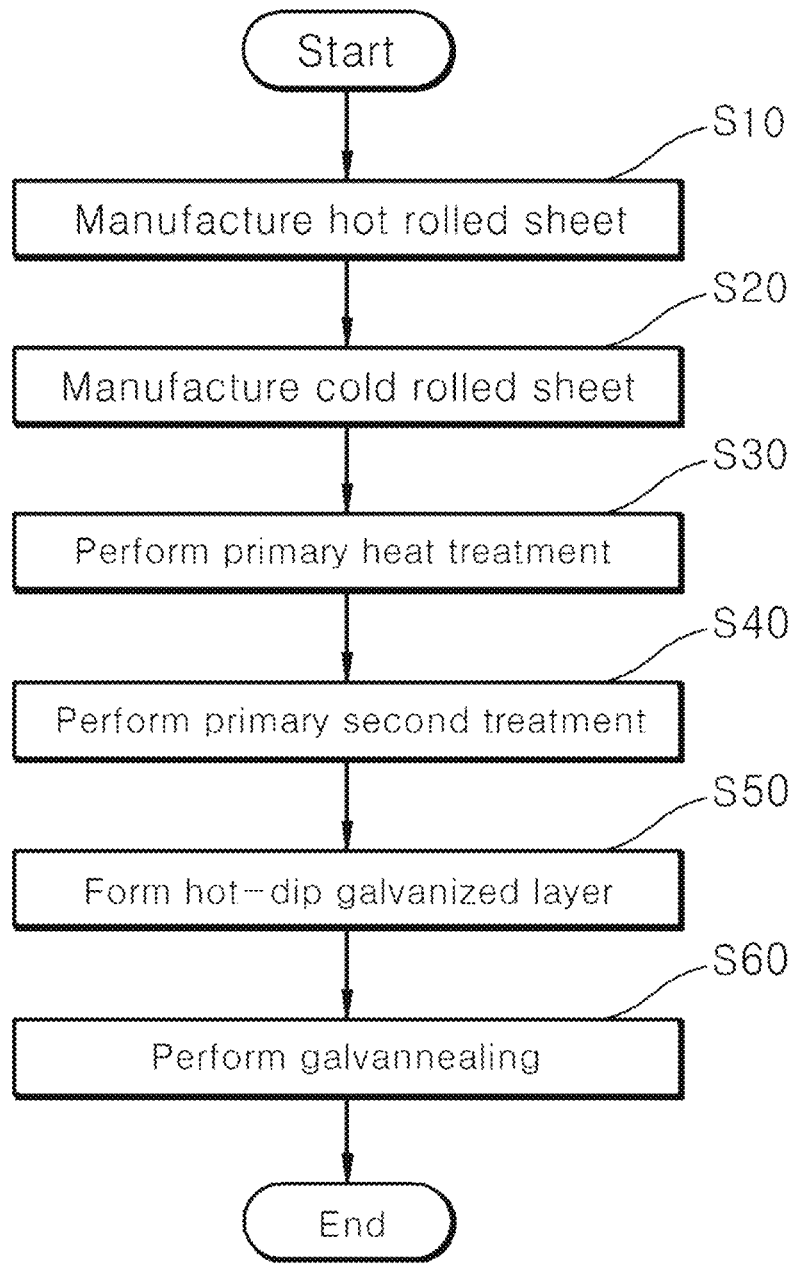
FIG. 1 illustrates a method for manufacturing a hot-dip galvannealed steel sheet according to an embodiment of the present invention.

Hereinafter, the present invention will be described in detail. Here, in describing the present invention, the detailed description of related known technology or configuration will be omitted if it is determined that the detailed description may unnecessarily obscure the subject matter of the present invention.

Further, the terms of constituent elements, which will be described hereinafter, are defined in consideration of their functions in the present invention and may be changed according to the intention of a user or an operator, or according to the custom. Accordingly, definitions of these terms must be based on the overall description herein.

In the case of ultra-high tensile steel having a dual-phase structure of conventional ferrite and martensite, when a steel material is subjected to plastic deformation, dislocations in the tissue are formed and moved, and as defects are formed and grown through the movement of these dislocations, plastic deformation occurs as a basic deformation mechanism in which fracture occurs. In order to secure the strength under such a deformation mechanism, martensite and bainite, which are in a hard phase, are formed to secure the strength, but reduction in an elongation is unavoidable as the strength is secured by increasing a fraction of the hard phase. Thus, in order to compensate for an elongation, ferrite, which is in a soft phase, is formed in the structure, and in the case of ultra-high tensile steel having such a final microstructure, a strength and an elongation follow the rule of mixture (ROM), making it difficult to improve materials beyond the rule of mixture.

A steel grade developed to improve the ultra-high-strength steel of the dual-phase structure of ferrite and martensite is a transformation induced plasticity steel that secures retained austenite in the final structure and secures a strength and an elongation through retained austenite phase transformation that occurs during plastic deformation. However, the transformation induced plasticity steel had a disadvantage in that it is difficult to significantly improve formability because an area ratio of retained austenite contained in the final microstructure is small.

Thus, an object of the present invention is to improve the formability of an ultra-high tensile steel by securing a large amount of retained austenite, and the final microstructure of the manufactured steel sheet is composed of ultrafine-grained ferrite and retained austenite. Retained austenite is a structure that easily secures strength, elongation, and formability of the steel sheet through transformation induced plasticity mechanism. However, if the retained austenite is contained excessively, alloying elements may be excessively required in order to secure stability for implementing the transformation induced plasticity mechanism and a hydrogen embrittlement resistance may be reduced, and thus, a content of the retained austenite is preferably 10 to 30 vol %. The balance is ultrafine-grained ferrite, and it is possible to obtain high strength even though ferrite, which is in a soft phase, is in the final microstructure through an ultrafine grained effect.

Annealed martensite and tempered martensite proposed in the related art are a hard phase structure capable of securing the strength of the manufactured steel sheet, but are not utilized in the present invention. The reason is that it may be difficult to secure an elongation due to securing the hard phase and a difference in materials from the surrounding soft phase occurs, such that a crack may be formed at a point where the material difference occurs, thereby causing material deterioration. In addition, bainite is also a kind of hard phase secured at a low temperature, and plays a role similar to that of annealed martensite and tempered martensite, and thus, it is ideally preferable that the bainite is not included.

In addition, as a galvannealing treatment is performed after hot-dip galvannealing, cementite (θ) is formed in the microstructure, such that the material may be reduced. Therefore, to this end, it is necessary to minimize the formation of the cementite by controlling a galvannealing treatment process.

Accordingly, a method for securing high formability of the hot-dip galvannealed steel sheet of the present invention by implementing the corresponding microstructures is summarized as follows.

(1) In order to secure retained austenite in the final microstructure after annealing heat treatment, steel making, continuous casting, hot rolling, and cold rolling are performed utilizing a component system including appropriate amounts of carbon (C) and manganese (Mn), which are austenite stabilizing elements. Carbon and manganese are elements that increase the stability of austenite, and should thus be included in appropriate amounts in the component system. In the case of silicon (Si), due to an increase in a rolling load during hot rolling, there is a possibility that difficulties will occur in increasing a size of a product and there is a possibility that a large amount of red scale will occur, and thus, an amount of silicon (Si) is controlled to be 1.0 wt % or less, and aluminum (Al) is helpful in securing mass productivity by widening the temperature range of a dual-phase domain, but if aluminum (Al) is contained too much, a continuous casting property may deteriorate, and thus, an amount of aluminum is controlled to 1.0 wt % or less. In addition, alloying elements such as titanium (Ti), niobium (Nb), vanadium (V), and molybdenum (Mo) are added to form an appropriate amount of carbide, which is helpful in securing an additional strength, but these alloying elements are not added if not necessary because an increase in cost and a reduction in elongation may be caused by the addition of the alloying elements.

(2) The annealing heat treatment is performed in a dual-phase domain. The reason is that if the annealing heat treatment is performed in the dual-phase domain, carbon and manganese progress from ferrite to austenite due to a solid solubility limit of ferrite in ferrite and austenite structures formed in the dual-phase domain, and the stability of austenite is secured, such that retained austenite may be secured after cooling. In addition, the annealing heat treatment is performed twice to control a shape of the final microstructure. Since an austenite formation point and a grain size during the heat treatment of a dual-phase domain change according to an initial microstructure, a structure shape is expressed differently, and as a result, a desired material may be secured.

(3) Finally, by controlling a galvannealing treatment temperature process, the formation of cementite is minimized, and a standard that may secure the material to the same level is established.

Hereinafter, a hot-dip galvannealed steel sheet having ultra-high strength and high formability of the present invention having the properties described above and a method for manufacturing the same will be described in more detail.

Hot-Dip Galvannealed Steel Sheet

One aspect of the present invention relates to a hot-dip galvannealed steel sheet. In an exemplary embodiment, the hot-dip galvannealed steel sheet includes: a base steel sheet; and a hot-dip galvannealed layer formed on the surface of the base steel sheet, wherein: the base steel sheet includes: an amount of 0.05 to 0.15 wt % of carbon (C), an amount greater than 0 and less than or equal to 1.0 wt % of silicon (Si), an amount of 4.0 to 9.0 wt % of manganese (Mn), an amount greater than 0 and less than or equal to 0.6 wt % of aluminum (Al), an amount greater than 0 and less than or equal to 0.02 wt % of phosphorus (P), an amount greater than 0 and less than or equal to 0.005 wt % of sulfur (S), an amount greater than 0 and less than or equal to 0.006 wt % of nitrogen (N), and the balance of iron (Fe) and other inevitable impurities. The base steel sheet has a microstructure composed of ferrite and retained austenite; the grain size of the microstructure is 3 μm or less; and the hot-dip galvannealed steel sheet has a yield strength (YS) of 800 MPa or greater, a tensile strength (TS) of 980 MPa or greater, an elongation (EL) of 25% or greater, and a hole expansion ratio (HER) of 20% or greater.

Hereinafter, the role and content of each component contained in a hot-dip galvannealed steel sheet according to an embodiment of the present invention will be described in detail.

Carbon (C): 0.05 wt % to 0.15 wt %

Carbon (C) is the most important alloying element in making of steel, and the primary purpose of the carbon in the present invention is to play a basic strengthening role and to stabilize austenite. A high concentration of carbon (C) in the austenite improves the stability of austenite, making it easy to secure appropriate austenite for material improvement. However, an excessively high content of carbon (C) may lead to a decrease in weldability due to an increase in carbon equivalent, and a plurality of cementite precipitating structures such as pearlite may be generated during cooling. Thus, it is preferable that carbon (C) is included in an amount of 0.05 to 0.15 wt % based on the total weight of the based steel sheet. If carbon (C) is included in an amount of less than 0.05 wt %, it is difficult to secure the strength of the steel sheet, and if carbon (C) is included in an amount exceeding 0.15 wt %, toughness and ductility may deteriorate.

Silicon (Si): Greater than 0 and Less than or Equal to 1.0 wt %

Silicon (Si) is an element that suppresses the formation of carbides in ferrite, in particular, prevents material degradation due to the formation of $Fe_3C$, and increases a diffusion rate of austenite by increasing the activity of carbon (C). Silicon (Si) is also known as a ferrite stabilizing element, and is known as an element that increases ductility by increasing the ferrite fraction during cooling. In addition, silicon (Si) has a very high ability to suppress the formation of carbides, and thus is a necessary element to secure a TRIP effect through an increase in carbon concentration in retained austenite when bainite is formed. However, if silicon (Si) is included in an amount exceeding 1.0 wt %, oxides ($SiO_2$) may be formed on the surface of the steel sheet during the process, such that the plating properties may be decreased due to the inferior wettability of the corresponding part, the rolling load increases during hot rolling, it is difficult to enlarge the product size, and a large amount of red scale may be generated. Therefore, it is preferable to add silicon (Si) in an amount of 1.0 wt % or less of the total weight of the base steel sheet.

Manganese (Mn): 4.0 wt % to 9.0 wt %

Manganese (Mn) is an austenite stabilizing element. As manganese (Mn) is added, Ms, which is a martensite formation starting temperature, is gradually decreased, thereby increasing a retained austenite fraction during annealing heat treatment. In addition, manganese (Mn) suppresses the formation of pearlite and bainite during cooling, thereby facilitating the formation of ultrafine-grained ferrite and retained austenite structures targeted in the present invention.

In an exemplary embodiment, manganese (Mn) is included in an amount of 4.0 to 9.0 wt % of the total weight of the base steel sheet. If manganese (Mn) is included in an amount of less than 4.0 wt %, the effect described above may be sufficiently secured. Conversely, if manganese (Mn) is included in an amount of exceeding 9.0 wt %, weldability is degraded due to an increase in carbon equivalent, and oxide (MnO) is formed on the surface of the steel sheet during the process, which may lead to a decrease in plating properties due to inferior wettability of the corresponding portion.

Aluminum (Al): Greater than 0 and Less than or Equal to 0.6 wt %

Like silicon (Si), aluminum (Al) is known as an element that stabilizes ferrite, stabilizes retained austenite, and suppresses the formation of carbides. In addition, aluminum (Al) has an effect of increasing an equilibrium temperature, so that when it is added, an appropriate heat treatment temperature range is widened. In an exemplary embodiment, the aluminum (Al) is included in an amount greater than 0 and less than or equal to 0.6 wt % based on the total weight of the base steel sheet. If the aluminum (Al) is excessively included in an amount of exceeding 0.6 wt %, a problem may occur in performance due to the precipitation of AlN.

At Least One of Niobium (Nb), Titanium (Ti), Vanadium (V), and Molybdenum (Mo): Greater than 0 and Less than or Equal to 0.2 wt %, Respectively In an exemplary embodiment of the present invention, niobium (Nb), titanium (Ti), vanadium (V), and molybdenum (Mo) may be selectively included in the base steel sheet.

The niobium (Nb), titanium (Ti), and vanadium (V) are elements that are precipitated in the form of carbides in steel, and are elements that are added to secure strength through the precipitation of carbides. Titanium (Ti) may serve to suppress the formation of AlN to suppress the formation of cracks during continuous casting. However, if each of niobium (Nb), titanium (Ti), and vanadium (V) is included in an amount exceeding 0.2 wt % based on the total weight of the base steel sheet, there are a disadvantages in that coarse precipitates are formed to reduce the amount of carbon in the steel to degrade the material, and the manufacturing cost increases due to the introduction of niobium (Nb), titanium (Ti), and vanadium (V). In addition, if titanium (Ti) is excessively added, it may cause nozzle clogging during continuous casting. Accordingly, if at least one of niobium (Nb), titanium (Ti) and vanadium (V) is added, each may be added in an amount greater than 0 and less than or equal to 0.2 wt % based on the total weight of the base steel sheet.

Next, the molybdenum (Mo) may serve to control the size of carbides by inhibiting the growth of the carbide. However, if molybdenum (Mo) is included in an amount exceeding 0.2 wt % based on the total weight of the base steel sheet, there are disadvantages in that the effect described above is saturated, and the manufacturing cost increases.

Boron (B): Greater than 0 and Less than or Equal to 0.001 wt %

In an exemplary embodiment of the present invention, boron (B) may be selectively included in the base steel sheet.

The boron (B) may function as an element that strengthens a grain boundary. In an exemplary embodiment, the boron (B) may be added in an amount greater than 0 and less than or equal to 0.001 wt % based on the total weight of the base steel sheet. If boron (B) is added in an amount exceeding 0.001 wt %, high-temperature ductility may be degraded by forming a nitride such as BN.

Other Elements

Phosphorus (P), sulfur (S), and nitrogen (N) may inevitably be added into the steel during a steelmaking process. That is, ideally, it is preferable that they are not included, but it is difficult to completely remove them due to process technology, such that a certain small amount thereof may be included.

The phosphorus (P) may play a role similar to silicon in steel. However, if phosphorus (P) is added in an amount exceeding 0.02 wt % of the total weight of the base steel sheet, the weldability of the steel sheet may be degraded and the brittleness thereof may be increased to cause material degradation. Therefore, phosphorus (P) may be controlled to be added in an amount greater than 0 and less than or equal to 0.02 wt % of the total weight of the base steel sheet.

The sulfur (S) may suppress toughness and weldability in the steel, and thus may be controlled to be included in an amount greater than 0 and less than or equal to 0.005 wt % of the total weight of the base steel sheet.

If the nitrogen (N) is present in an excessive amount in the steel, a large amount of nitride may be precipitated to degrade ductility. Therefore, nitrogen (N) may be controlled to be included in an amount greater than 0 and less than or equal to 0.006 wt % based on the total weight of the based steel sheet.

The based steel sheet having the alloying components described above has a microstructure composed of ferrite and retained austenite.

In an exemplary embodiment, the volume fraction of the retained austenite in the microstructure may be 10 to 30 vol %.

In an exemplary embodiment, the grains of the base steel sheet may be fine grains each having a size of 3 µm or less. For example, the fraction of high-angle grain boundaries among the grains may be 60% or greater, preferably 70% or greater. The high-angle grain boundary may mean a grain boundary in which an angle between adjacent grains is 15° or greater.

The hot-dip galvannealed steel sheet may have material properties: 800 MPa or greater of a yield strength (YS), 980 MPa or greater of a tensile strength (TS), 25% or greater of an elongation (EL), and 20% or greater of a hole expansion ratio (HER).

For example, the hot-dip galvannealed steel sheet may have material properties: 800 MPa to 1,100 MPa of a yield strength (YS), 980 MPa to 1,200 MPa of a tensile strength (TS), 25 to 30% of an elongation (EL), and 20 to 30% of a hole expansion ratio (HER).

Conventionally, when the component of the car body is formed, there was a case that may not be explained by evaluation criteria such as drawability and bi-axial stretchability that may be confirmed in a general forming limit diagram, during the breakage of the component at the time of being formed, which occurs in an ultra-high strength material.

This may be explained through the stretch-flangeability of the material, which is a new evaluation criteria, and through the hole expansion ratio (HER) evaluation test to measure this, when the component of the car body is formed, the possibility of fracture and molding of the corresponding part may be estimated.

In a hole extension ratio evaluation test (based on ISO standard 16630), after a hole is punched in a sheet with a punch, a test is terminated when a crack is observed in which a crack is completely propagated in a thickness direction of the sheet by inserting a punch into the hole, and then hole expansion ratio is evaluated as a ratio of an initial hole size to a hole size ((broken hole size−initial hole size)/initial hole size×100(%)) after the test is terminated.

This hole expansion ratio generally tends to decrease as the strength increases. Thus, it is important to secure an elongation in order to improve the formability of ultra-high strength steel, but it is also important to secure the hole expansion ratio to some extent.

Accordingly, the present invention intends to secure improved elongation and the same level of a hole expansion ratio as compared to an ultra-high tensile steel having an existing dual-phase microstructure of ferrite and martensite by utilizing the dual-phase microstructure of ferrite and retained austenite. To this end, a target material could be secured by strictly controlling the process conditions to implement a final microstructure. Also, the process range for the production of a hot-dip galvannealed steel sheet was confirmed by observing the change in materials according to the galvannealing treatment temperature condition.

Method for Manufacturing Hot-Dip Galvannealed Steel Sheet

Another aspect of the present invention relates to a manufacturing method of the hot-dip galvannealed steel sheet. FIG. 1 illustrates a method for manufacturing a hot-dip galvannealed steel sheet according to an exemplary embodiment of the present invention. Referring to FIG. 1, the method for manufacturing the hot-dip galvannealed steel sheet includes: (S10) a hot-rolled sheet manufacturing step; (S20) a cold-rolled sheet manufacturing step; (S30) a primary heat treatment step; (S40) a secondary heat treatment step; (S50) a hot-dip galvanized layer forming step; and (S60) a galvannealing treatment step.

More specifically, the method for manufacturing the hot-dip galvannealed steel sheet includes: (S10) manufacturing a hot-rolled sheet using a steel slab, wherein the steel slab includes: an amount of 0.05 to 0.15 wt % of carbon (C), an amount greater than 0 and less than or equal to 1.0 wt % of silicon (Si), an amount of 4.0 to 9.0 wt % of manganese (Mn), an amount greater than 0 and less than or equal to 0.6 wt % of aluminum (Al), an amount greater than 0 and less than or equal to 0.02 wt % of phosphorus (P), an amount greater than 0 and less than or equal to 0.005 wt % of sulfur (S), an amount greater than 0 and less than or equal to 0.006 wt % of nitrogen (N), and the balance of iron (Fe) and other inevitable impurities; (S20) manufacturing a cold-rolled sheet by cold rolling the hot-rolled sheet; (S30) performing a primary heat treatment by heating the cold-rolled sheet in a temperature range of $A_{c3}$ to $(A_{c3}+15)$ ° C.; (S40) performing a secondary heat treatment by heating the cold-rolled sheet subjected to the primary heat treatment at a temperature of a dual-phase domain; (S50) forming a hot-dip galvanized layer by immersing the cold-rolled sheet subjected to the secondary heat treatment in a hot-dip galvanizing bath; and (S60) performing a galvannealing treatment on the cold-rolled sheet on which the hot-dip galvanized layer is formed, wherein after step (S40), the cold-rolled sheet has a microstructure composed of ferrite and retained austenite.

Hereinafter, the method for manufacturing the hot-dip galvannealed steel sheet of the present invention will be described in detail step by step.

(S10) Hot-Rolled Sheet Manufacturing Step

The above step is a step of manufacturing a hot-rolled sheet using a steel slab, wherein the steel slab includes: an amount of 0.05 to 0.15 wt % of carbon (C), an amount greater than 0 and less than or equal to 1.0 wt % of silicon (Si), an amount of 4.0 to 9.0 wt % of manganese (Mn), an amount greater than 0 and less than or equal to 0.6 wt % of aluminum (Al), an amount greater than 0 and less than or equal to 0.02 wt % of phosphorus (P), an amount greater than 0 and less than or equal to 0.005 wt % of sulfur (S), an amount greater than 0 and less than or equal to 0.006 wt % of nitrogen (N), and the balance of iron (Fe) and other inevitable impurities.

In an exemplary embodiment, the steel slab further may include one or more components of niobium (Nb), titanium (Ti), vanadium (V), and molybdenum (Mo), and each of the one or more components may be included in an amount greater than 0 and less than or equal to 0.02 wt %.

In an exemplary embodiment, the steel slab may further include boron (B) in an amount greater than 0 and less than or equal to 0.001 wt %.

In an exemplary embodiment, since the alloying components and contents constituting the steel slab are the same as those described above, a detailed description thereof will be omitted.

In an exemplary embodiment, the hot-rolled sheet may be manufactured by including: (a1) reheating the steel slab to a temperature of 1150 to 1250° C.; (a2) preparing a rolled material by hot rolling the reheated steel slab at a finish rolling temperature of 925 to 975° C.; and (a3) cooling the rolled material subjected to the hot rolling treatment at a cooling rate of 10 to 30° C./s, and coiling the cold-rolled material under conditions of a coiling temperature of 700° C. to 800° C.

The reheating temperature of the steel slab is preferably about 1150 to 1250° C. so as to secure a normal hot rolling temperature. If the reheating temperature is less than 1150° C., a problem in that the hot rolling load rapidly increases may occur. If the reheating temperature exceeds 1250° C., it may be difficult to charge and discharge from a furnace due to the bending of the steel slab, and it may be difficult to secure the strength of a finally produced steel sheet due to coarsening of the initial austenite grains.

In the hot rolling, a rolled material may be prepared by hot rolling the reheated steel slab to a finish rolling temperature of 925 to 975° C. Considering that the steel slab of the present invention is a high alloy steel having a high content of alloying elements such as manganese, the finish rolling may be performed at a high temperature of 925 to 975° C. Under the above conditions, it is possible to prevent edge bursting of the rolled material during coiling and minimize the rolling load.

The hot-rolled rolled material may be cooled at a cooling rate of 10 to 30° C./s, and the cold-rolled material may be wound under a condition of a coiling temperature of 700 to 800° C. By cooling the rolled material under the above conditions, it is possible to prevent edge bursting of the rolled material during coiling and minimize the rolling load. The cooling method may be applied to a water-free cooling method.

In an exemplary embodiment, the hot-rolled sheet may have a full martensitic structure after cooling.

Softening Heat Treatment Step

In an exemplary embodiment of the present invention, a softening heat treatment step of the hot-rolled sheet may be further included, between the hot-rolled sheet manufacturing step (S10) and the cold-rolled sheet manufacturing step (S20) to be described later.

The softening heat treatment, before cold rolling the hot-rolled sheet having the full martensitic structure, may proceed to reduce the rolling load during cold rolling.

In an exemplary embodiment, the softening heat treatment may be performed under a condition of a temperature of 550 to 650° C. When the softening heat treatment is performed at a temperature of less than 550° C., only tempering proceeds without recrystallization of the martensite produced after the hot rolling, so that supersaturated carbon in the structure may be formed in a form of cementite (θ) and may be spheroidized. In this case, since the brittleness of the martensite may be expressed, fracture of the sheet may occur during cold rolling. Meanwhile, when the softening heat treatment is performed at a temperature higher than 650° C., austenite is excessively formed during the softening heat treatment, and martensite is formed from the austenite during cooling, such that a decrease in strength during the softening heat treatment may not effectively occur. By the softening heat treatment in the above temperature range, the martensitic structure after the hot rolling may be converted into a composite structure of ferrite and retained austenite.

(S20) Cold-Rolled Sheet Manufacturing Step

The above step is a step of manufacturing a cold-rolled sheet by cold rolling the hot-rolled sheet. In an exemplary embodiment, the cold rolling may be performed on of the hot-rolled sheet under a condition of a reduction ratio of 40 to 60%. By the cold rolling, the composite structure of ferrite and retained austenite after the softening heat treatment may be converted into a composite structure of ferrite and martensite.

The annealing heat treatment of the present invention may be performed including: performing a primary heat treatment on the cold-rolled sheet in a temperature range of $A_{c3}$ to $(A_{c3}+15)$ ° C. and performing a secondary heat treatment at a temperature of a dual-phase domain for the cold-rolled sheet subjected to the primary heat treatment.

(S30) Primary Heat Treatment Step

The above step is a step of performing a primary heat treatment by heating the cold-rolled sheet in a temperature range of $A_{c3}$ to $(A_{c3}+15)$ ° C.

In an exemplary embodiment, the primary heat treatment may convert a composite structure of ferrite and martensite of the sheet after cold rolling into a structure of martensite. The primary heat treatment may include: heating the cold-rolled sheet to a temperature range of $A_{c3}$ to $(A_{c3}+15)$ ° C., which is a target temperature, at an elevated temperature rate of 1 to 3° C./s, and maintaining the heated cold-rolled sheet for 40 to 120 seconds.

In the primary heat treatment, the temperature range of $A_{c3}$ to $(A_{c3}+15)$ ° C. may be, for example, a temperature of 760 to 790° C. If the primary heat treatment temperature is less than 760° C., austenite grains of sufficient size may not be secured at the target temperature, and a composite structure of martensite and ferrite is also formed after heat treatment, such that strength and ductility may be decreased in the final structure following the primary heat treatment. On the other hand, if the primary heat treatment temperature exceeds 790° C., the size of the austenite grains at the target temperature is excessively increased, which is disadvantageous in securing stabilization of austenite in the final structure according to the primary heat treatment, and thus may be inferior in terms of strength.

When the elevated temperature rate during the primary heat treatment is less than 1° C./s, a retention time at the target temperature of 760 to 790° C. exceeds the range of 40 to 120 seconds, such that ae austenite grain size at the target temperature may be excessively increased. On the other hand, when the elevated temperature rate exceeds 3° C./s, a retention time at the target temperature of 760 to 790° C. is less than the range of 40 to 120 seconds, such that a sufficient austenite grain size at the target temperature may not be secured.

For example, the primary heat treatment may include cooling and maintaining the heated cold-rolled sheet to 350 to 450° C. at a cooling rate of 4 to 10° C./s. For example, it can be maintained by cooling the cold-rolled sheet to 380 to 420° C. In an exemplary embodiment, the cold-rolled sheet cooled to the above temperature may be aged for 120 to 330 seconds.

(S40) Secondary Heat Treatment Step

The step is a step of performing a secondary heat treatment by heating the cold-rolled sheet subjected to the primary heat treatment at a temperature of a dual-phase domain. The secondary heat treatment is performed at a temperature of a dual-phase domain, which is the target temperature range, so that the martensitic structure after the primary heat treatment may be changed to a structure of ferrite and retained austenite. The secondary heat treatment is performed in the temperature range of a dual-phase domain, which is a temperature at which cementite starts to form.

In an exemplary embodiment, the secondary heat treatment is performed by heating the cold-rolled sheet to a target temperature of 650 to 670° C. at an elevated temperature rate of 1 to 4° C./s, and maintaining the heated cold-rolled sheet for 50 to 200 seconds. Here, a volume fraction of the retained austenite may be 10 to 30 vol %.

If the secondary heat treatment temperature is less than 650° C., an excessively small amount of austenite structure may be formed at the target temperature to increases the stability of austenite, and thus, after cooling, the austenite on the microstructure does not exhibit a phase transformation during plastic deformation, such that strength and ductility may be decreased. On the other hand, if the secondary heat treatment temperature exceeds 670° C., an excessively large amount of austenite structure may be formed at the target temperature to decrease the stability of austenite, and thus, after cooling, martensite is formed on the microstructure, such that ductility and a hole expansion ratio may be reduced.

When the elevated temperature rate during the secondary heat treatment is less than 1° C./s, before the cold-rolled sheet reaches the temperature range of a dual-phase domain, the material properties may be degraded by forming or spheroidizing unnecessary cementite, making it impossible to secure the material properties. If the elevated temperature rate exceeds 4° C./s, the cold-rolled sheet material may not be maintained for 50 to 200 seconds in the target temperature range, so that it may not be possible to secure a sufficient fraction of retained austenite in the final structure.

In an exemplary embodiment, the secondary heat treatment may include; cooling and maintaining the heated cold-rolled sheet to a temperature of 450 to 550° C. at a cooling rate of 2 to 8° C./s. In an exemplary embodiment, the cold-rolled sheet cooled to the above temperature may be aged for 120 to 330 seconds.

(S50) Hot-Dip Galvanized Layer Forming Step

The step is a step of forming a hot-dip galvanized layer by immersing the cold-rolled sheet subjected to the secondary heat treatment in a hot-dip galvanizing bath. The temperature of the hot-dip galvanizing bath may be 450 to 550° C. depending on the type and ratio of alloying elements constituting the galvanized layer, and a composition system of the base (cold-rolled sheet). As the hot-dip galvanized layer is easily formed on the surface of the cold-rolled sheet under the galvanizing bath conditions, the adhesion of the hot-dip galvanized layer may be excellent.

(S60) Galvannealing Treatment Step

The above step is a galvannealing treatment step of the cold-rolled sheet on which the hot-dip galvanized layer is formed. In an exemplary embodiment, the galvannealing treatment may be performed under a condition of a temperature of 500 to 650° C. As the hot-dip galvannealed layer is stably grown during the galvannealing treatment under the above conditions, the adhesion of the hot-dip galvannealed layer may be excellent. The galvannealing treatment may be performed at a temperature of 500 to 600° C. for 10 to 45 seconds. When the galvannealing treatment is performed at a temperature of less than 500° C., the alloying may not proceed sufficiently, and thus soundness of the hot-dip galvannealed layer may be degraded. When the galvannealing treatment is performed at a temperature higher than 600° C., as the galvannealing treatment shifts to the temperature range of a dual-phase domain, a ferrite-austenite fraction optimized in the secondary heat treatment step may be deviated, and a change in material may occur, and ductility may not be secured due to the rapid formation of cementite.

In an exemplary embodiment, after the secondary heat treatment step (S40), the cold-rolled sheet may have 800 MPa or greater of a yield strength (YS), 980 MPa or greater of a tensile strength (TS), 25% or greater of an elongation (EL), and 20% or greater of a hole expansion ratio (HER). For example, the cold-rolled sheet may have material properties: 800 MPa to 1,100 MPa of a yield strength (YS), 980 MPa to 1,200 MPa of a tensile strength (TS), 25 to 30% of an elongation (EL), and 20 to 30% of a hole expansion ratio (HER).

Factors influencing the final manufactured steel sheet material include increased strength due to refinement of ferrite grains and secured strength and elongation due to phase transformation of retained austenite caused by transformation induced plasticity according to securing retained austenite stability. The steel sheet of the present invention may have a grain size of a final microstructure of 3 μm or less, for example 2 μm or less, and a high-angle grain boundary ratio of 60% or greater, preferably 70% or greater, thereby improving crack resistance and stably securing a target hole expansion ratio.

In the present invention, in order to secure ultra-high strength, high elongation, and hole expansion ratio at the same time, a final microstructure was set according to the following principle, and the process optimization for realizing the ultra-high strength, high elongation, and hole expansion ratio was performed together with the deep neural network-based optimization technique.

Design direction (1): In securing an elongation, unlike securing the soft phase in the final microstructure in the existing ultra-high tension steel to secure an elongation, it is intended to secure an improved elongation by securing more retained austenite utilized in the transformation induced plasticity steel in the final microstructure. In addition, it may be effective in increasing the strength of the material by forming a hard phase such as martensite and bainite, but was excluded because it is disadvantageous in securing an elongation, and the elongation that may be reduced is compensated for by constructing the final microstructure using a ferrite matrix.

Design direction (2): In securing the hole expansion ratio, first, it is necessary to examine the test criteria for evaluating the hole expansion ratio. In a hole extension ratio evaluation test (based on ISO standard 16630), after a hole is punched in a sheet with a punch, a test is terminated when a crack is observed in which a crack is completely propagated in a thickness direction of the sheet by inserting a punch into the hole, and then hole expansion ratio is evaluated as a ratio of an initial hole size to a hole size ((broken hole size−initial hole size)/initial hole size×100(%)) after the test is terminated. That is, it was determined that suppressing the formation and propagation of cracks due to deformation during evaluation would have a major effect on improving the hole expansion ratio. For this purpose, it was attempted to secure crack resistance in the final microstructure, and in the case of a hard phase such as martensite and bainite, the martensite and bainite were excluded from the final microstructure because the boundary could become a crack formation point due to local deformation caused by a difference in material between the hard phase and the soft phase during initial deformation.

Design direction (3): In securing the elongation and hole expansion ratio of the hot-dip galvannealed steel sheet of the present invention, the unsatisfactory strength was secured by utilizing ultrafine granulation of the ferrite matrix and the transformation induced plasticity of the retained austenite.

Design direction (4): After secondary heat treatment (annealing heat treatment), immersion and galvannealing treatment were performed in a hot-dip galvanizing bath in order to manufacture a hot-dip galvannealed steel sheet, and then cooling was performed to room temperature. When the galvannealing treatment process is performed, the material may be changed due to the change of the microstructure configured through the secondary annealing, so it is necessary to set a sound galvannealing treatment process management range that satisfies the target material.

In order to configure the microstructure as described above, the present invention was to secure a target material by implementing the final microstructure of ultrafine grained ferrite and retained austenite through two-stage annealing heat treatment and galvannealing treatment.

In addition, the effects that may be obtained from the present invention are as follows.

(1) Securing strength and elongation using a reinforcing mechanism based on a transformation induced plasticity steel: in securing elongation, unlike securing the soft phase in the final microstructure in the existing ultra-high tension steel to secure an elongation, it is intended to secure an improved elongation by securing more retained austenite utilized in the transformation induced plasticity steel in the final microstructure. In addition, it may be effective in increasing the strength of the material by forming a hard phase such as martensite and bainite, but was excluded because it is disadvantageous in securing an elongation, and the elongation and strength that may be reduced are compensated for by constructing the final microstructure using an ultrafine grained ferrite matrix.

(2) Improvement of hole expansion ratio by controlling the final microstructure through control of the annealing process: in order to improve the hole expansion ratio as compared to the existing ultra-high-strength steel, it was attempted to secure crack resistance in the final microstructure, and in the case of a hard phase such as martensite and bainite, the martensite and bainite were excluded from the final microstructure because the boundary could become a crack formation point due to local deformation caused by a difference in material between the hard phase and the soft phase during initial deformation. The crack resistance of the final microstructure was secured by securing the fraction of high-angle grain boundaries and fine grains through process control.

It should be noted in (1) and (2) above, that, unlike the existing inventions for securing strength and formability by utilizing a hard phase structures such as martensite and bainite, the present invention differs from the existing inventions in that only dual-phase structure of ultrafine-grained ferrite and retained austenite is used. In addition, unlike the existing inventions that simply suggest a theoretically wide range of processes when controlling the annealing process heat treatment conditions, the present invention can be said to have a difference because a clear solution for securing the final target material and detailed conditions of annealing heat treatment for implementing the same have been proposed through theory and experimentation.

(3) Sound hot-dip galvannealed steel sheet production possibility through establishment of alloying process conditions: in addition, as a result of referring to examples of the existing inventions, only alloying was performed after first-stage annealing heat treatment in producing the hot-dip galvannealed steel sheet or only examples for cold rolled materials were disclosed and only the simple principle that the hot-dip galvannealed steel sheet may be produced was disclosed in the examples to claim rights, but the alloying process conditions that may produce a sound hot-dip galvannealed steel sheet were not considered at all. The present invention proposed an alloying process condition control range in addition to two-stage annealing heat treatment for securing a material to enable production of a sound hot-dip galvannealed steel sheet at the time of working with reference to an alloying process condition.

EXAMPLE

Hereinafter, a configuration and an operation of the present invention will be described in more detail with reference to preferred examples of the present invention. However, the following Examples are intended to assist in the understanding of the present invention, and the scope of the present invention is not limited to the following Examples.

Examples 1 to 6 and Comparative Examples 1 to 6

Through a continuous casting process, a steel slab including the component system of the content shown in Table 1 and the balance of iron (Fe) and other inevitable impurities was manufactured. The steel slab was reheated to a reheating temperature of 1150 to 1250° C., and the reheated steel slab was hot rolled to a finish rolling temperature of 925 to 975° C. to prepare a rolled material, the rolled material subjected to the hot rolling was cooled at a cooling rate of 10 to 30° C./s, and was wound up at a coiling temperature of 700 to 800° C. to manufacture a hot-rolled sheet. The hot-rolled sheet was subjected to a softening heat treatment under the conditions of a temperature of 550 to 650° C., and cold rolling was performed under the conditions of a reduction ratio of 40 to 60% to manufacture a cold-rolled sheet.

The cold-rolled sheet was subjected to a primary heat treatment by heating and cooling under the conditions shown in Table 2 below, and the secondary heat treatment was performed by heating and cooling the cold-rolled sheet subjected to the primary heat treatment under the conditions shown in Table 2 below. Then, the cold-rolled sheet subjected to the secondary heat treatment was immersed in a hot-dip galvanizing bath to form a hot-dip galvanized layer, and a galvannealing treatment was performed at a temperature of 500 to 600° C. for 10 to 45 seconds to manufacture a hot-dip galvannealed steel sheet.

For Examples 1 to 6 and Comparative Examples 1 to 6, the tensile strength, yield strength, elongation, tensile strength×elongation of the specimen, the volume fraction of the retained austenite microstructure, the average grain size, the fraction of high-angle grain boundaries (HAGBs), and the hole expansion ratio (based on ISO standard 16630) of the steel sheet were measured at the time the secondary heat treatment was completed. It was evaluated whether the target value of the target material of the present invention was achieved, and the results are shown in Table 3 below.

TABLE 1

| (wt %) | C | Si | Mn | Al | P | S | N |
|---|---|---|---|---|---|---|---|
| Component system | 0.09 | 0.78 | 6.01 | 0.521 | 0.006 | 0.002 | 0.004 |

TABLE 2

| | Primary heat treatment | | | | |
|---|---|---|---|---|---|
| Division | Elevated temperature rate (° C./s) | Annealing temperature (° C.) | Holding time (s) | Cooling rate (° C./s) | Cooling end temperature (° C.) |
| Example 1 | 1.5 | 780 | 80 | 6 | 400 |
| Example 2 | 1.5 | 780 | 80 | 6 | 400 |
| Example 3 | 1.5 | 780 | 80 | 6 | 400 |
| Example 4 | 1.5 | 790 | 80 | 6 | 400 |
| Example 5 | 1.5 | 790 | 80 | 6 | 400 |
| Example 6 | 1.5 | 790 | 80 | 6 | 400 |
| Comp. Example 1 | 1.5 | 780 | 80 | 6 | 400 |
| Comp. Example 2 | 1.5 | 780 | 80 | 6 | 400 |
| Comp. Example 3 | 1.5 | 780 | 80 | 6 | 400 |
| Comp. Example 4 | 1.5 | 790 | 80 | 6 | 400 |

TABLE 2-continued

| Division | | | | | |
|---|---|---|---|---|---|
| Comp. Example 5 | 1.5 | 790 | 80 | 6 | 400 |
| Comp. Example 6 | 1.5 | 790 | 80 | 6 | 400 |

| | Secondary heat treatment | | | | |
|---|---|---|---|---|---|
| Division | Elevated temperature rate (° C./s) | Annealing temperature (° C.) | Holding time (s) | Cooling rate (° C./s) | Cooling end temperature (° C.) |
| Example 1 | 1.5 | 650 | 80 | 6 | 400 |
| Example 2 | 1.5 | 660 | 80 | 6 | 400 |
| Example 3 | 1.5 | 670 | 80 | 6 | 400 |
| Example 4 | 1.5 | 650 | 80 | 6 | 400 |
| Example 5 | 1.5 | 660 | 80 | 6 | 400 |
| Example 6 | 1.5 | 670 | 80 | 6 | 400 |
| Comp. Example 1 | 1.5 | 640 | 80 | 6 | 400 |
| Comp. Example 2 | 1.5 | 680 | 80 | 6 | 400 |
| Comp. Example 3 | 1.5 | 690 | 80 | 6 | 400 |
| Comp. Example 4 | 1.5 | 640 | 80 | 6 | 400 |
| Comp. Example 5 | 1.5 | 680 | 80 | 6 | 400 |
| Comp. Example 6 | 1.5 | 690 | 80 | 6 | 400 |

TABLE 3

| Division | Yield strength (MPa) | Tensile strength (MPa) | Elongation (%) | Tensile strength × Elongation (MPa × %) | Retained austenite (Vol %) | Grains (μm) | HAGBs (%) | Hole expansion ratio (%) | Whether or not material is achieved |
|---|---|---|---|---|---|---|---|---|---|
| Example 1 | 924 | 1027 | 25 | 25675 | 20 | ≤2 | 65 | 23 | ○ |
| Example 2 | 934 | 1074 | 26 | 27924 | 22 | ≤2 | 73 | 27 | ○ |
| Example 3 | 889 | 1120 | 26 | 29120 | 24 | ≤2 | 75 | 28 | ○ |
| Example 4 | 919 | 1013 | 25 | 25325 | 19 | ≤3 | 67 | 21 | ○ |
| Example 5 | 921 | 1049 | 28 | 29372 | 23 | ≤2 | 70 | 26 | ○ |
| Example 6 | 895 | 1093 | 27 | 29511 | 23 | ≤3 | 71 | 27 | ○ |
| Comp. Example 1 | 917 | 964 | 23 | 22172 | 17 | ≤2 | 63 | 21 | X |
| Comp. Example 2 | 903 | 1133 | 22 | 24926 | 20 | ≤1 | 69 | 22 | X |
| Comp. Example 3 | 831 | 1178 | 19 | 22382 | 16 | ≤2 | 68 | 20 | X |
| Comp. Example 4 | 923 | 957 | 22 | 21054 | 16 | ≤2 | 64 | 20 | X |
| Comp. Example 5 | 856 | 1137 | 24 | 27288 | 21 | ≤3 | 65 | 21 | X |
| Comp. Example 6 | 821 | 1176 | 19 | 22344 | 15 | ≤2 | 66 | 22 | X |

Figure 2:
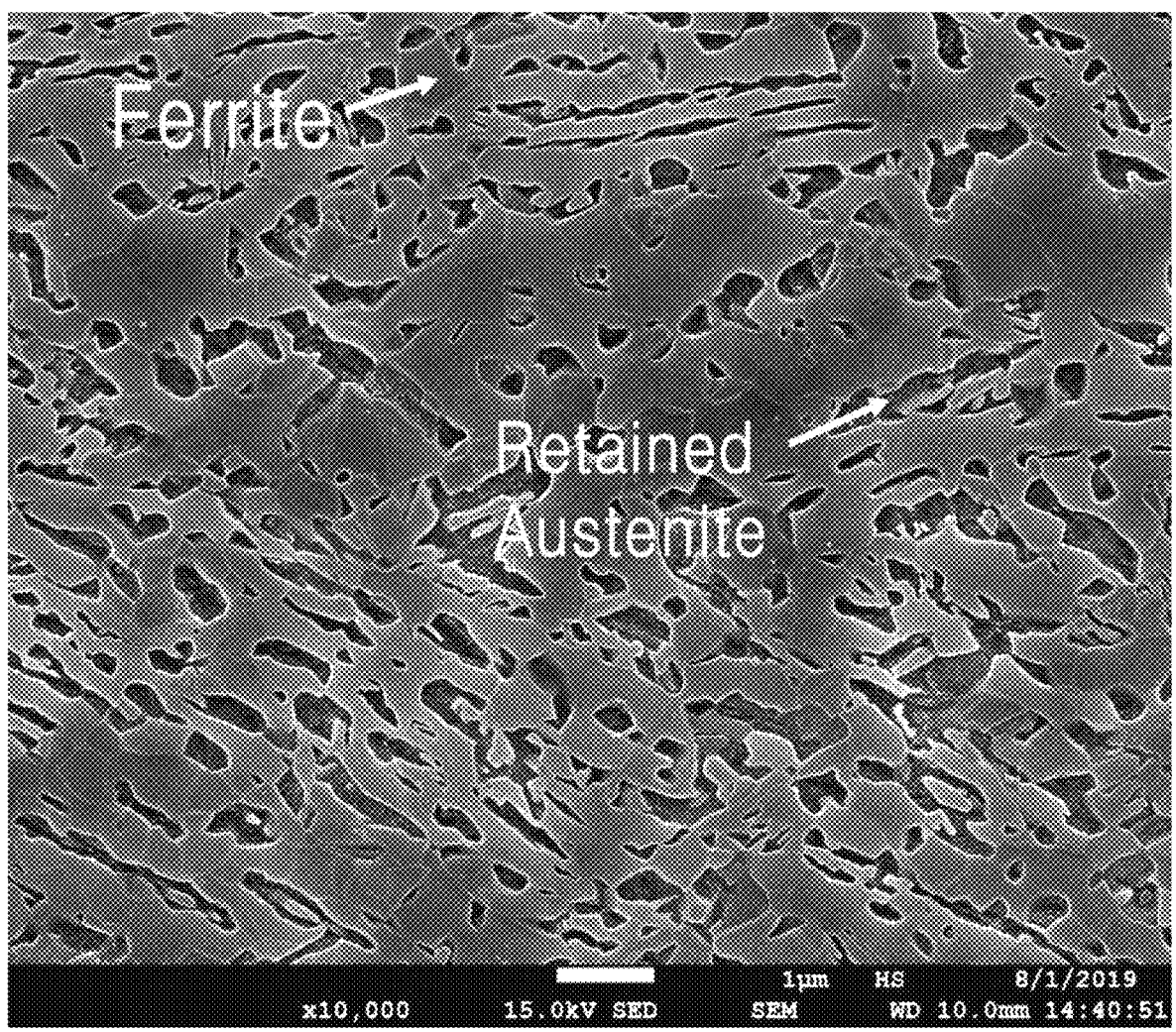
FIG. 2 is a photograph illustrating a microstructure of a hot-dip galvannealed steel sheet according to an embodiment of the present invention.

FIG. 2 is a photograph illustrating a microstructure of a hot-dip galvannealed steel sheet according to an embodiment of the present invention. Specifically, FIG. 2 is a photograph of a microstructure of the specimen of Example 1. Referring to Table 3 and FIG. 2, in the specimen of Example 1, 20 vol % of retained austenite and the balance of ferrite were observed.

The target values of the material properties of the hot-dip galvaannealed steel sheet of the present invention are a yield strength of 800 MPa or greater, a tensile strength of 980 MPa or greater, an elongation of 25% or greater, a retained austenite volume fraction of 10 to 30%, and a hole expansion ratio of 20% or greater.

Referring to the results of Table 3, in Examples 1 to 6, the conditions of the primary and secondary heat treatment (annealing temperature) according to the present invention are applied, when the retained austenite volume fraction and the diffusion amount of carbon and manganese are ideal, austenite is formed in the final microstructure in the form of retained austenite without phase transformation during final cooling, and in the case of ferrite, the structure is induced even after cooling, so that a dual-phase structure of ferrite and retained austenite may be formed.

It can be estimated that in the case of the final material, the tensile strength×total elongation value is about 25,000 to 27,000 MPa, which generally satisfies the tensile strength× total elongation value of 25,000 MPa, which is generally suggested as a high-formed steel sheet at the corresponding strength level, and the formability will be similar or superior to those of the Comparative Examples of the same strength when the hole expansion ratio is considered as well.

In securing the elongation in relation to the design direction (1), it is necessary to form a lot of retained austenite in the final microstructure, and for this, it is important to secure the stability of austenite so that the austenite is not phase-transformed into the martensite during cooling after annealing heat treatment. Therefore, a component system containing an appropriate amount of austenite stabilizing elements such as carbon and manganese was constructed, and carbon and manganese were diffused into austenite while performing annealing heat treatment in the dual-phase domain section in order to secure the desired fraction of ferrite and retained austenite so that a target fraction of retained austenite could be secured and the balance could be composed of ferrite upon cooling.

On the other hand, similarly to the two-stage heat treatment as in Examples 1 to 6, the first-stage annealed material subjected to the annealing heat treatment process once in the dual-phase domain may also reach the target material, but it may be difficult to secure hole expansion ratio depending on microstructure shape and grain boundary configuration at the time of securing the hole expansion ratio, which will be described later.

On the other hand, it can be seen that in the case of Comparative Examples 2, 3, 5, and 6, which exceed the secondary heat treatment temperature of the present invention, as an excessive amount of austenite was formed during the heat treatment of a dual-phase domain, the amount of carbon and manganese diffused per grain of austenite decreased overall, so the stability of austenite decreased on average, and some austenite was phase transformed into martensite upon cooling after annealing, such that the strength increased but the elongation decreased.

In addition, even when the target annealing temperature is higher than the target annealing temperature as in Comparative Examples 2, 3, 5 and 6, although there is a possibility that the material may be secured, this may also be disadvantageous in terms of mass production and cost because excessively large amounts of carbon, manganese, etc, should be contained in order to additionally secure elongation.

On the other hand, in the case of Comparative Examples 1 and 4, which are less than the secondary heat treatment temperature of the present invention, as austenite was formed too little during the heat treatment of a dual-phase domain, the amount of carbon and manganese diffused per grain of austenite increased overall, so the stability of austenite increased on average, and the phase transformation into martensite did not proceed during cooling, but when plastic deformation proceeded, the martensite was phase transformed and the amount of retained austenite capable of securing both strength and elongation was also reduced, resulting in reducing strength and elongation.

Therefore, the secondary heat treatment temperature was performed at a temperature at which cementite starts to form in the temperature range of a dual-phase domain, and the secondary annealing temperature range is preferably set to a temperature of 650 to 670° C.

In securing the hole expansion ratio in relation to the design direction (2), the present invention was intended to improve crack resistance of the final microstructure, and methods for microstructurally improving the crack resistance include various mechanisms such as crack propagation bypass, grain boundary enhancement, and crack propagation shielding. Among them, in the present invention, the crack resistance of the final microstructure was improved, through a method of minimizing points (such as the phase boundary between the hard phase and the soft phase) that may become crack formation points, and suppressing crack propagation by reducing low angle grain boundaries (LAGBs), increasing the fraction of high angle grain boundaries (HAGBs), and refining grains, and the process design that may implement it will be described in detail.

First, in order to minimize the points that may become crack formation points in the final microstructure, the phase boundary between the hard phase and the soft phase was minimized by not composing a hard phase such as martensite and bainite on the final microstructure, In addition, it was also intended to minimize the point between precipitates and grains, and in the embodiment of the present invention, a component system without adding a precipitate forming element was used in order to minimize the interface between the precipitates and the grains. When it is necessary to add the corresponding element for other reasons, the corresponding elements may be added in an appropriate amount, but the amount should be limited.

In order to increase the fraction of high-angle grain boundaries in the final microstructure, a two-stage heat treatment was used in the present invention. The two-stage heat treatment is divided into two stages: a primary annealing heat treatment, in which the cold-rolled steel sheet was heated to a temperature above the $A_{c3}$ single-phase domain ($A_{c3}$ to $A_{c3}+15°$ C.), cooled, and the original microstructure was annealed and then composed of martensite, and a secondary annealing heat treatment, in which the first annealed material obtained through the first annealing heat treatment was heat treated in a temperature range of a dual-phase domain of $A_{c1}$ to $A_{c3}$, and cooled to implement a final microstructure of ultrafine-grained ferrite and retained austenite.

It is possible to increase the fraction of high-angle grain boundaries in the final microstructure compared to the first-stage annealing heat treatment by performing the two-stage annealing heat treatment. In the case of the one-stage annealed material, this is because as recrystallization occurs actively before austenite reverse transformation in the temperature range of a dual-phase domain during annealing heat treatment due to the high dislocation density in the deformed martensite, which occurs during cold rolling, a large amount of new ferrite grains with an orientation similar to the orientation of the same initial austenite grains were generated, and in this case, it had a similar orientation between the surrounding grains, and a large amount of low-angle grain boundaries were formed.

To the contrary, in the case of the two-stage annealed material of the present invention, this is because martensite formed by cooling tends to maintain its original shape without active recrystallization before austenite reverse transformation during annealing heat treatment, and the formation of low-angle grain boundaries was relatively small. As described in the design direction (1), the single-stage annealed material may secure the material in terms of tensile strength and elongation, but it is difficult to secure a hole expansion ratio. Thus, in order to secure the fraction of high-angle grain boundaries in the final microstructure, two-stage annealing heat treatment is required.

In order to refine the grains of the final microstructure in relation to the design direction (3), the microstructure should be refined together before the annealing heat treatment is performed. As explained in the section on securing high-angle grain boundaries, if the two-stage annealing heat treatment is performed to form a structure with improved hole expansion ratio and at the same time the grains are refined, it is advantageous in securing the stability of retained austenite, and the propagation of cracks my also be effectively suppressed. However, since the recrystallization behavior before reverse transformation to austenite is not active when the second-stage annealing heat treatment is performed, it is important to control the grain size of the initial austenite formed in the initial first-stage annealing heat treatment in order to refine the grains in the microstructure. This is because, in the case of two-stage annealing heat treatment, recrystallization does not proceed actively, so the grain size of the initial martensite plays an effective role in the grain size of the final microstructure, and also because grains, a packet size, and a block width of martensite formed by cooling tend to become smaller as the grain size of austenite becomes smaller.

Meanwhile, it can be confirmed how much the grain size of the final microstructure varies according to the grain size of initial austenite depending on the primary annealing temperature. Also, it can be confirmed from the results in Table 3 that the size of the final microstructure increased as the primary annealing temperature increases by 10° C. from 780° C. to 790° C.

Accordingly, as the primary annealing temperature rises, it is more disadvantageous to form a coarser ferrite matrix in terms of strength and at the same time to secure austenite stability, so it can be expected to be inferior in terms of strength. When comparing Examples 1 to 3 (first annealing temperature: 780° C.) and Examples 4 to 6 (primary annealing temperature: 790° C.), it can be confirmed that Examples 4 to 6 are inferior in terms of strength, therefore, in the present invention, the primary annealing temperature range is limited to $A_{c3}$ or higher, which is the temperature starting point of a dual-phase domain, and more preferably from $A_{c3}$ to $(A_{c3}+15)$ ° C.

Finally, as suggested in the design direction (4), the influence of the alloying process for producing the hot-dip galvannealed steel sheet on the material should also be considered. The corresponding temperature range is a temperature range in which cementite (θ) may be formed according to thermodynamic calculations, and in the case of cementite, some effects such as precipitation hardening may occur, but since it may act as a crack formation point, the strength tends to increase slightly and the elongation tends to decrease. Therefore, it is important to prevent such cementite from being formed during the alloying process, and this was intended to be confirmed through the control of the alloying temperature and time.

Examples 7 to 18 and Comparative Example 7

The cold-rolled sheet manufactured in the same manner as in Example 1 was subjected to a primary heat treatment by heating and cooling under the conditions shown in Table 2 below, and the secondary heat treatment was performed by heating and cooling the cold-rolled sheet subjected to the primary heat treatment under the conditions shown in Table 2 below. Then, the cold-rolled sheet subjected to the secondary heat treatment was immersed in a hot-dip galvanizing bath to form a hot-dip galvanized layer, and alloyed heat treatment was performed under the conditions of Table 4 below to manufacture a hot-dip galvannealed steel sheet.

For the hot-dip galvannealed steel sheet specimens of Examples 7 to 18 and Comparative Example 7, the tensile strength, yield strength, elongation, tensile strength×elongation of the specimen, the volume fraction of the retained austenite microstructure, the average grain size, and the fraction of high-angle grain boundaries (HAGBs) of the steel sheet were measured. It was evaluated whether the target value of the target material of the present invention was achieved, and the results are shown in Table 5 below.

TABLE 4

| Division | Primary heat treatment | | | | | Secondary heat treatment |
|---|---|---|---|---|---|---|
| | Elevated temperature rate (° C./s) | Annealing temperature (° C.) | Holding time (s) | Cooling rate (° C./s) | Cooling end temperature (° C.) | Elevated temperature rate (° C./s) |
| Example 7 | 1.5 | 785 | 80 | 6 | 400 | 4 |
| Example 8 | 1.5 | 785 | 80 | 6 | 400 | 2.5 |
| Example 9 | 1.5 | 785 | 80 | 6 | 400 | 4 |
| Example 10 | 1.5 | 785 | 80 | 6 | 400 | 2.5 |
| Example 11 | 1.5 | 785 | 80 | 6 | 400 | 2.5 |
| Example 12 | 1.5 | 785 | 80 | 6 | 400 | 2.5 |
| Example 13 | 1.5 | 785 | 80 | 6 | 400 | 2.5 |
| Example 14 | 1.5 | 785 | 80 | 6 | 400 | 2.5 |
| Example 15 | 1.5 | 785 | 80 | 6 | 400 | 2.5 |
| Example 16 | 1.5 | 785 | 80 | 6 | 400 | 2 |
| Example 17 | 1.5 | 785 | 80 | 6 | 400 | 1.5 |
| Example 18 | 1.5 | 785 | 80 | 6 | 400 | 1 |
| Comp. Example 7 | 1.5 | 785 | 80 | 6 | 400 | 2.5 |

| Division | Secondary heat treatment | | | | Alloying condition | |
|---|---|---|---|---|---|---|
| | Annealing temperature (° C.) | Holding time (s) | Cooling rate (° C./s) | Cooling end temperature (° C.) | Alloying temperature (° C.) | Alloying time (s) |
| Example 7 | 665 | 53 | 8 | 490 | 500 | 11 |
| Example 8 | 665 | 80 | 5.5 | 490 | 500 | 16 |
| Example 9 | 665 | 53 | 8 | 490 | 520 | 11 |
| Example 10 | 665 | 80 | 5.5 | 490 | 520 | 16 |
| Example 11 | 665 | 53 | 8 | 490 | 540 | 11 |
| Example 12 | 665 | 80 | 5.5 | 490 | 540 | 16 |
| Example 13 | 665 | 80 | 5.5 | 490 | 560 | 16 |
| Example 14 | 665 | 80 | 5.5 | 490 | 580 | 16 |

TABLE 4-continued

| | | | | | | |
|---|---|---|---|---|---|---|
| Example 15 | 665 | 80 | 5.5 | 490 | 600 | 16 |
| Example 16 | 665 | 100 | 4 | 490 | 540 | 20 |
| Example 17 | 665 | 130 | 3 | 490 | 540 | 27 |
| Example 18 | 665 | 200 | 2 | 490 | 540 | 41 |
| Comp. Example 7 | 665 | 80 | 5.5 | 490 | 620 | 16 |

TABLE 5

| Division | Yield strength (MPa) | Tensile strength (MPa) | Elongation (%) | Tensile strength × Elongation (MPa × %) | Retained austenite (Vol %) | Grains (μm) | HAGBs (%) | Hole expansion ratio (%) | Whether or not material is achieved |
|---|---|---|---|---|---|---|---|---|---|
| Example 7 | 954 | 1072 | 26 | 27872 | 24 | ≤2 | 65 | 22 | ○ |
| Example 8 | 965 | 1087 | 25 | 27175 | 23 | ≤2 | 67 | 20 | ○ |
| Example 9 | 963 | 1072 | 25 | 26800 | 26 | ≤3 | 70 | 26 | ○ |
| Example 10 | 970 | 1094 | 25 | 26256 | 20 | ≤2 | 64 | 20 | ○ |
| Example 11 | 969 | 1052 | 26 | 27352 | 23 | ≤2 | 69 | 22 | ○ |
| Example 12 | 948 | 1096 | 25 | 27400 | 21 | ≤2 | 71 | 27 | ○ |
| Example 13 | 981 | 1136 | 26 | 29536 | 24 | ≤1 | 67 | 21 | ○ |
| Example 14 | 1006 | 1123 | 25 | 28075 | 22 | ≤2 | 69 | 22 | ○ |
| Example 15 | 979 | 1106 | 25 | 27650 | 20 | ≤2 | 71 | 26 | ○ |
| Example 16 | 967 | 1144 | 26 | 29744 | 23 | ≤2 | 71 | 27 | ○ |
| Example 17 | 976 | 1127 | 27 | 30429 | 24 | ≤2 | 73 | 28 | ○ |
| Example 18 | 962 | 1107 | 27 | 29889 | 26 | ≤2 | 70 | 26 | ○ |
| Comp. Example 7 | 983 | 1117 | 24 | 26808 | 21 | ≤1 | 68 | 18 | X |

Examples 7 to 18 and Comparative Example 7 of Table 5 show changes in materials depending on the alloying process conditions of the present invention. Referring to Table 5, it can be seen that in Examples 7 to 18, which correspond to the alloying process range of the present invention, only a slight increase in strength and a decrease in elongation occurred, and no significant material deterioration occurred.

This may be because when the microstructure after the alloying process was observed with a scanning electron microscope as shown in FIG. 1, the average stability of retained austenite was increased compared to Examples 1 to 6 in a state in which the alloying process was not performed because the portion in which cementite was not formed and time for manganese and carbon to diffuse were additionally given. Although there was no significant decrease in elongation because cementite was not formed in a large amount, it is presumed that this is because the average stability of retained austenite increased, so the amount of phase transformation that occurred during plastic deformation had changed under conditions in which optimum stability was secured without an alloying process.

In addition, the present invention is determined that alloying process conditions and annealing heat treatment conditions may be further expanded through the addition of silicon and aluminum, but in this case, there may be problems in securing mass productivity in continuous casting and hot rolling, and thus, the component system should be adjusted in consideration of the issue. It is determined that the present invention was performed with a composition of an amount of 0.78 wt % of silicon, an amount of 6.01 wt % of manganese, and an amount of 0.5 wt % of aluminum, but even if the content of the corresponding component is reduced in order to secure mass productivity, it will have the same tendency as in the Examples, and it will be more advantageous to form a sound plating layer.

Therefore, it can be confirmed that a hot-dip galvannealed steel sheet of ultra-high tensile and high formability having high formability compared to the existing ultra-high tensile steel may be manufactured through the present invention.

Simple modifications or changes of the present invention can be easily implemented by those of ordinary skill in the art, and all such modifications or changes should be construed as being included in the scope of the present invention.

The invention claimed is:

1. A hot-dip galvannealed steel sheet, comprising:
a base steel sheet; and
a hot-dip galvannealed layer formed on the surface of the base steel sheet;
wherein the base steel sheet comprises: an amount of 0.05 to 0.15 wt % of carbon (C), an amount greater than 0 and less than or equal to 1.0 wt % of silicon (Si), an amount of 4.0 to 9.0 wt % of manganese (Mn), an amount greater than 0 and less than or equal to 0.6 wt % of aluminum (Al), an amount greater than 0 and less than or equal to 0.02 wt % of phosphorus (P), an amount of greater than 0 and less than or equal to 0.005 wt % of sulfur(S), an amount of greater than 0 and less than or equal to 0.006 wt % of nitrogen (N), and the balance being iron (Fe) and other inevitable impurities;
the base steel sheet has a microstructure composed of ferrite and retained austenite,
the average grain size of the microstructure is 3 μm or less,
a fraction of high-angle grain boundaries among the grains in the base steel sheet is 60% or greater,
wherein the high-angle grain boundary is a grain boundary in which an angle between adjacent grains is 15° or greater, and
the hot-dip galvannealed steel sheet has a yield strength (YS) of 800-1100 MPa, a tensile strength (TS) of 980-1200 MPa, an elongation (EL) of 25-30%, and a hole expansion ratio (HER) of 20-30%.

2. The hot-dip galvannealed steel sheet of claim 1, wherein the base steel sheet further comprises one or more components of niobium (Nb), titanium (Ti), vanadium (V), and molybdenum (Mo),
wherein each of the one or more components is included in an amount greater than 0 and less than or equal to 0.02 wt %.

3. The hot-dip galvannealed steel sheet of claim 1, wherein the base steel sheet further comprises boron (B) in an amount greater than 0 and less than or equal to 0.001 wt %.

4. The hot-dip galvannealed steel sheet of claim 1, wherein a volume fraction of the retained austenite in the microstructure is 10 to 30 vol %.

5. A method for manufacturing a hot-dip galvannealed steel sheet according to claim 1, the method comprising:
(a) manufacturing a hot-rolled sheet from a steel slab, wherein the steel slab comprises: an amount of 0.05 to 0.15 wt % of carbon (C), an amount greater than 0 and less than or equal to 1.0 wt % of silicon (Si), an amount of 4.0 to 9.0 wt % of manganese (Mn), an amount greater than 0 and less than or equal to 0.6 wt % of aluminum (Al), an amount greater than 0 and less than or equal to 0.02 wt % of phosphorus (P), an amount greater than 0 and less than or equal to 0.005 wt % of sulfur(S), an amount greater than 0 and less than or equal to 0.006 wt % of nitrogen (N), and the balance being iron (Fe) and other inevitable impurities;
(b) manufacturing a cold-rolled sheet by cold rolling the hot-rolled sheet;
(c) performing a primary heat treatment by heating the cold-rolled sheet in a temperature range of $A_{c3}$ to ($A_{c3}+15°$ C.), wherein $A_{c3}$ is a temperature at which ferrite is completely transformed into austenite during heating;
(d) performing a secondary heat treatment by heating the cold-rolled sheet subjected to the primary heat treatment at a temperature of a dual-phase domain;
(e) forming a hot-dip galvanized layer by immersing the cold-rolled sheet subjected to the secondary heat treatment in a hot-dip galvanizing bath; and
(f) performing a galvannealing treatment on the cold-rolled sheet on which the hot-dip galvanized layer is formed,
wherein after the step (d), the cold-rolled sheet has a microstructure composed of ferrite and retained austenite.

6. The method of claim 5, wherein the steel slab further includes one or more components of niobium (Nb), titanium (Ti), vanadium (V), and molybdenum (Mo),
wherein each of the one or more components is included in an amount greater than 0 and less than or equal to 0.02 wt %.

7. The method of claim 5, wherein the steel slab further comprises boron (B) in an amount greater than 0 and less than or equal to 0.001 wt %.

8. The method of claim 5, wherein a volume fraction of the retained austenite in the microstructure is 10 to 30 vol %.

9. The method of claim 5, wherein the step (c) includes: cooling the heated cold-rolled sheet to a temperature of 350° C. to 450° C. at a cooling rate of 4 to 10° C./s.

10. The method of claim 5, wherein the step (d) includes: cooling the heated cold-rolled sheet to a temperature of 450° C. to 550° C. at a cooling rate of 2 to 8° C./s.

11. The method of claim 5, wherein the hot-rolled sheet is manufactured by:
(a1) reheating the steel slab to a temperature of 1150° C. to 1250° C.;
(a2) making a hot-rolled material by hot rolling the reheated steel slab at a finish rolling temperature of 925° C. to 975° C.; and
(a3) cooling the hot-rolled material subjected to the hot rolling treatment at a cooling rate of 10 to 30° C./s, and coiling the hot-rolled material at a coiling temperature of 700° C. to 800° C.

12. The method of claim 5, further comprising, between the step (a) and the step (b), subjecting the hot-rolled sheet to a softening heat treatment at a temperature of 550° C. to 650° C.

13. The method of claim 5, wherein the galvannealing treatment in the step (f) is performed at a temperature of 500° C. to 600° C.

14. The method of claim 5, wherein after the step (d), the cold-rolled sheet has a yield strength (YS) of 800-1100 MPa, a tensile strength (TS) of 980-1200 MPa, an elongation (EL) of 25-30%, and a hole expansion ratio (HER) of 20-30%.

15. The method of claim 5, wherein after the step (d), the grain size of the cold-rolled sheet is 3 µm or less.

* * * * *